United States Patent [19]

Sjolund

[11] Patent Number: 4,492,245

[45] Date of Patent: Jan. 8, 1985

[54] NOZZLE AND FLAPPER WITH SQUEEZE FILM DAMPING

[75] Inventor: John R. Sjolund, St. Paul, Minn.

[73] Assignee: Sundstrand Corporation, Rockford, Ill.

[21] Appl. No.: 416,738

[22] Filed: Sep. 18, 1982

[51] Int. Cl.[3] .............................. F15B 5/00; F16F 9/34

[52] U.S. Cl. .................................. 137/82; 137/625.62

[58] Field of Search ................ 137/82, 625.64, 625.62; 251/48; 188/266, 306, 322.22, 378, 379, 380; 73/430, 707

[56] References Cited

U.S. PATENT DOCUMENTS 3,221,760 12/1965 Buchanan .............................. 137/82
3,323,090 5/1967 O'Brien .......................... 137/625.62
3,882,976 5/1975 Nash .................................... 188/306

*Primary Examiner*—Martin P. Schwadron
*Assistant Examiner*—Mark Malkin
*Attorney, Agent, or Firm*—James A. Wanner; Ted E. Killingsworth; Michael B. McMurray

[57] ABSTRACT

An electro-hydraulic control structure having a control input positioning a flapper relative to a nozzle to generate a control output pressure is provided with a squeeze film damper which utilizes the flapper, or an extension thereof, as the movable element of the squeeze film damper. Preferably the flapper is pivoted and forms with the nozzle exhaust passageway a tapered gap receiving a small portion of the nozzle flow which acts as the damping fluid. The majority of the nozzle flow passes through a hollow portion of the flapper located downstream of the nozzle.

20 Claims, 7 Drawing Figures

NOZZLE AND FLAPPER WITH SQUEEZE FILM DAMPING

TECHNICAL FIELD

This invention relates to a squeeze film damper forming a part of an electro-hydraulic control structure wherein a flapper is used to modulatingly control the flow of fluid through a nozzle to generate a control pressure upstream of the nozzle. The improvement comprises a portion or extension of the flapper which extends into a passageway which receives at least a portion of the fluid flow from the nozzle to form a squeeze film damper to stabilize movement of the flapper, particularly at harmonic frequencies. Preferably, the passageway is the exhaust passageway receiving the fluid flow from the nozzle, and the flapper includes a hollow portion permitting passage of the majority of fluid flow.

BACKGROUND ART

The field in which the invention is utilized includes many examples of structures utilizing a flapper which is positioned relative to a nozzle or a pair of opposed nozzles to control the flow of fluid through such nozzles to generate a control pressure or a control pressure differential upstream of the nozzle or nozzles. Generally these structures include a control input such as an electric force motor or a thermostatic bi-metal element which modulates the position of the flapper relative to the nozzle or nozzles. As the need for faster acting and more accurate controls has developed, attempts have been made to reduce centering forces, such as spring forces, on the flapper so that the input force and nozzle flow forces generate a larger percentage of the total force applied to the flapper to position the flapper relative to the nozzles. The spring mass system determines a natural harmonic frequency at which the flapper may vibrate under certain conditions. Such harmonic vibration of the flapper generates an annoying buzz and furthermore reduces response time for stabilized control and accuracy of the flapper movement relative to the nozzles.

Attempts have been made to damp the movement of the flapper particularly in the range of harmonic frequencies so as to reduce these adverse effects. One such attempt is represented by U.S. patent Hedlund, U.S. Pat. No. 3,426,970 , issued Feb. 11, 1969, wherein a particular physical relationship between the nozzle end face and the flapper is provided to reduce vibratory motion of the flapper. Such a flapper nozzle end face parameter design however is maximized for damping action and does not permit the nozzle to be designed to the ultimate parameters relative to flow control. Testing has shown that the most effective nozzle flapper interface is defined by a sharp edge whereas the damping feature of Hedlund requires a broad flapper/nozzle end wall interface. The squeeze film damper of the present invention is spaced from the flapper/nozzle interface but still utilizes the fluid flow from the nozzle to provide fluid for the damping action.

U.S. patent Lloyd, U.S. Pat. No. 3, 009,447, issued Nov. 21, 1961 teaches an electric force motor pressure control wherein a spring centered flapper is positioned between two opposed nozzles to provide a control pressure differential upstream of the nozzle which acts as the pilot control pressure. There is no disclosure of damping action generated between the flapper and the flat end faces of the opposed nozzle and this interface would have the same problems of interfering with maximizing the control of nozzle flow as discussed above with respect to Hedlund. Furthermore Lloyd utilizes a complicated pressure and velocity feedback system including an auxiliary load mass to provide refined system control.

One manufacturer utilizes a restriction in the exhaust passageway to aid in damping undesirable vibrations in an arrangement including an electric force motor controlling a flapper relative to a nozzle. It is believed that such an arrangement is relatively ineffective in damping harmonic vibration and increases the pressure downstream of the nozzles. This reduces the available pressure drop across the nozzles which in turn reduces the allowable or permissible pressure differential that can be generated.

While various studies of squeeze film damping have been conducted, for example, the June 1966 *Journal of Basic Engineering* article entitled "A Study of Squeeze-Film Damping", such studies are generally directed to flat plate damping and not directed to the specific damping structure of the present invention or the utilization thereof in an arrangement where a flapper controls nozzle flow.

BRIEF SUMMARY OF THE INVENTION

The present invention is directed to a squeeze film damper for use with a fluid control system wherein a flapper is positioned relative to a nozzle or plurality of nozzles by an applied control force to modulate the flow of fluid through the nozzle or nozzles to generate a back pressure upstream of the nozzles, such back pressure or differential of back pressures being utilized as a control output. The squeeze film damper has two relatively movable surfaces, one of which is provided by the flapper or an extension thereof and the other of which is provided by a passageway which receives fluid from the nozzle or nozzles. The flapper, or the extension thereof, is positioned within the passageway and the two relatively movable parts are dimensioned so as to permit control movement of the flapper but of sufficiently close positioning that squeeze film damping by the control fluid can be provided to limit excessive oscillations of the flapper. The squeeze film damper has a damping effect which is proportional to the velocity of relative movement of the two parts so that relatively low frequencies of control movementare not significantly damped but relatively high frequencies of induced harmonic action are significantly damped.

It is an object of the present invention to provide such an above described squeeze film damper which is simple, requires little modification to previous existing structures, and does not significantly increase the overall size of the flapper/nozzle arrangement.

It is a further object of the present invention to provide a squeeze film damper of the type described above wherein the fluid passageway cooperating with the flapper to provide squeeze film damping serves the additional function of the exhaust passageway for fluid passing from the nozzle or nozzles associated with the control structure. In the preferred form of practicing the invention, the portion of the flapper located within the exhaust passageway has an internal bore providing exhaust flow for the majority of the nozzle flow so that the small portion of the fluid flow utilized in providing the damping action does not restrict exhaust flow in a manner which causes a high back pressure downstream of the nozzles.

In the preferred form of practicing the invention it is also an object to utilize a pivoted flapper which extends into the exhaust passageway and wherein the two movable parts forming the squeeze film damper have a progressively increasing taper which permits pivoting of the flapper structure and yet maintains close peripheral gap relationship between the two movable parts over a significant axial length to provide an effective squeeze film damper. Preferrably such damping structure is located near the free end of the flapper and thus the damping action is provided at the longest possible moment arm relative to the pivot of the flapper so that a small damping force provides the most effective damping action.

It is also an object of the present invention to provide a squeeze film damper for a fluid control having a nozzle directed toward a control flapper which is adapted to be positioned relative to the nozzle by an applied control force wherein the flow of fluid through the nozzle is controlled by the distance between the nozzle and the flapper to generate a control back pressure upstream of the nozzle and with the flow from the nozzle passing through an exhaust passageway downstream of the nozzle and extending away from the nozzle; the squeeze film damper comprising a portion of the flapper spaced from the nozzle and extending into the exhaust passageway to cooperate with the passageway in a manner which provides a peripheral gap between the external periphery of the flapper and the internal wall of the passageway, the peripheral gap being of sufficient size to permit control movement of the flapper while the peripheral gap is of limited cross sectional area to permit the periphery of the flapper and the internal wall of the passageway to cooperate with fluid in the gap to generate a damping action upon movement of the flapper.

DETAILED DESCRIPTION OF THE PREFERRED EMBODIMENT

Figure 1:
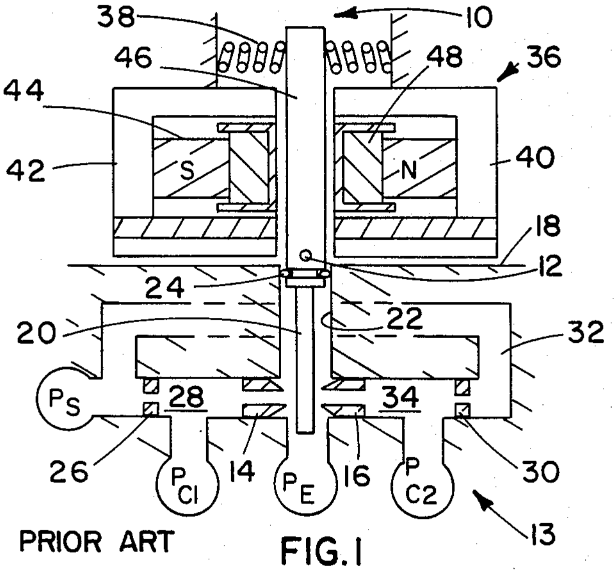
FIG. 1 is a partially schematic cross sectional view of an electric force motor control with a flapper/nozzle arrangement to provide a differential control pressure.

While the present invention can be utilized with many forms of pneumatic and hydraulic flapper/nozzle control system wherein an outside control force is applied to the flapper to position the flapper relative to a nozzle to generate a back pressure upstream of the nozzle, the preferred form of practicing the invention as herein described is applied to a hydraulic control whose output is a pressure differential and wherein the input control force is provided by an electric force motor which when in a null or zero current position centers a flapper relative to two opposed nozzles to generate a differential pressure output. An example of a prior art structure without the present invention is shown in FIG. 1 wherein a flapper 10 is centrally mounted on a pivot 12 in a control device 13 so as to be positioned between two opposed fluid nozzles 14 and 16 secured within a pilot valve housing 18. The flapper 10 has a lower portion below the pivot herein referred to as the flapper section 20 located within a bore or passageway 22 perpendicular to the two opposed nozzles 14 and 16. The upper end of the bore 22 is sealed by an O-ring 24 mounted on the flapper 10.

The control is connected to a source of supply pressure at port $P_s$ which provides a fluid to nozzles 14 and 16 at a uniform pressure. For a pneumatic control the fluid would be a gas. For a hydraulic control the fluid would be a liquid such as hydraulic oil. The fluid is supplied to nozzle 14 through a fixed orifice 26 with a chamber 28 being defined by the fixed orifice 26 and nozzle 14. The fluid is provided to nozzle 16 through a fixed orifice 30 which is connected to the pressure supply port $P_s$ by conduit 32 which is not in communication with the flapper passage or bore 22. The fixed orifice 30 and the nozzle 16 define a second chamber 34.

The position of flapper section 20 relative to the two nozzles 14 and 16 will determine the amount of fluid flow through the two nozzles and thus the back pressure developed in chambers 28 and 34. When the flapper section 20 is centered between the two nozzles, there will be equal fluid flow through the two nozzles and thus the pressures in chambers 28 and 34 will be equal. When the flapper 10 is pivoted clockwise around the pivot 12, the flapper section 20 will approach the nozzle 14 and move away from the nozzle 16. This action restricts the flow through nozzle 14 which increases the back pressure in chamber 28 and allows greater flow through nozzle 16 which reduces the back pressure in chamber 34. Counterclockwise movement of flapper 10 will produce the opposite result. The pressures in the two chambers 28 and 34 are communicated with output control ports $P_{c1}$ and $P_{c2}$ respectively. By connecting an operation device such as a cylinder to the control ports or another control system such as a servo valve to the control ports, the pressure differential between the control ports $P_{c1}$ and $P_{c2}$ can be used to provide an operating function or a further control function. If only one nozzle is utilized, the pressure developed behind such nozzle by movement of the flapper section 20 which restricts flow through the nozzle may be utilized as the control output pressure.

The fluid flow through the nozzle or nozzles must be exhausted to drain or an area of reduced pressure relative to the supply pressure introduced at the supply port $P_s$. This is represented by the supply port $P_e$ connected to the bore or passageway 22 which contains the flapper section 20. Any restriction to flow within the bore 22 or the exhaust port $P_e$ increases the pressure within bore 22 which reduces the available pressure drop across the nozzles and thus the flow through the nozzles 14 and 16. This in turn reduces the potential pressure differential between the chambers 28 and 34 and thus the pressure differential available at the control ports $P_{c1}$ and $P_{c2}$.

While many forms of control forces can be applied to the flapper 10, the prior art example of FIG. 1 utilizes an electric force motor 26 to control the pivotal motion of the flapper 10. The electric force motor 36 includes a spring 38 which provides a mechanical centering force on the flapper 10. In a practical or commercial construction, spring 38 is normally adjustable in order to provide a centered or null position for the flapper 10. The electric force motor 36 further provides a permanent magnetic centering structure consisting of pole pieces 40 and 42 joined by permanent magnets 44 (one shown) having north and south poles connected to the pole pieces 40 and 42 respectively. The permanent magnets 44 are disposed in planes in front of and behind the flapper 10. The flapper 10 has an upper section above the pivot 12 which forms the armature for an electric force motor 36. Preferrably, the mechanical centering force provided by the spring 38 and the magnetic centering force provided by the permanent magnets 44 are substantially balanced and cancel each other so that the resultant force on the armature 46 is only a slight centering force. Positioned around the armature 46 is an electric coil 48 which is electrically connected to an input signal by wires not shown. The current induced in coil 48 by the input signal is used to create a magnetic field in the armature 46 which modulatingly controls the pivoting of flapper 10 to operate the flapper/nozzle control.

It is noted that the bores of the nozzles 14 and 16 are relatively large compared to the bores of the restricted orifices 26 and 30. The relatively large bores of the nozzles 14 and 16 allow sufficient pressure area to substantially swamp out the small centering forces which are the resultant of the permanent magnetic and mechanical centering forces described above. Since the flapper 10 is a part of a spring-mass system, it will have an inherent or natural harmonic frequency at which the flapper 10 will vibrate when unbalanced forces are applied thereto. This natural frequency will be in the range of 400 to 500 Hz which is approximately three times the frequency that may be induced to the flapper 10 by the natural control forces of the electric force motor 36 and the flapper/nozzle arrangement. Harmonic vibration of the flapper 10 generates an annoying buzz and also affects the control modulation of the flapper 10. Since there is some oil always present in the bore or passage way 22 from the flow through the nozzles, there is some resistance to the movement of the flapper 10. However any damping effect is quite slight and does not substantially reduce or eliminate the adverse effects caused by harmonic vibration of the flapper 10.

Figure 2:
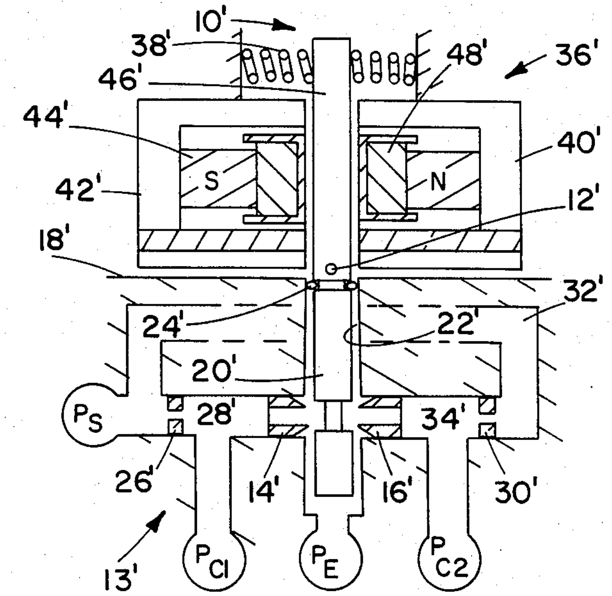
FIG. 2 is a partially schematic cross sectional view of the pressure control of FIG. 1 modified to incorporate the present invention.

The electric force motor positioned flapper/nozzle arrangement of FIG. 2 is a modified version of the Prior Art arrangement of FIG. 1 with the squeeze film damper of the present invention added to reduce adverse vibration of the flapper. Since the elements of the construction of FIG. 2, except in the area of the squeeze film damper, are identical to the elements of the structure of FIG. 1, the same numerals are utilized to identify identical parts except that the numerals of FIG. 2 are primed. The electric force motor 36' is identical to the electic force motor 36 and the pilot valve 13' construction is identical with the pilot valve 13 construction except that the bore or passage 22' is elongated and tapered relative to the bore 22 and the flapper section 20' is of different configuration than the flattened flapper section 20 of FIG. 1. Thus it can be seen that the improved pilot valve 13 of FIG. 2 requires little modification and a slight increase in size over the prior art construction.

Figure 3:
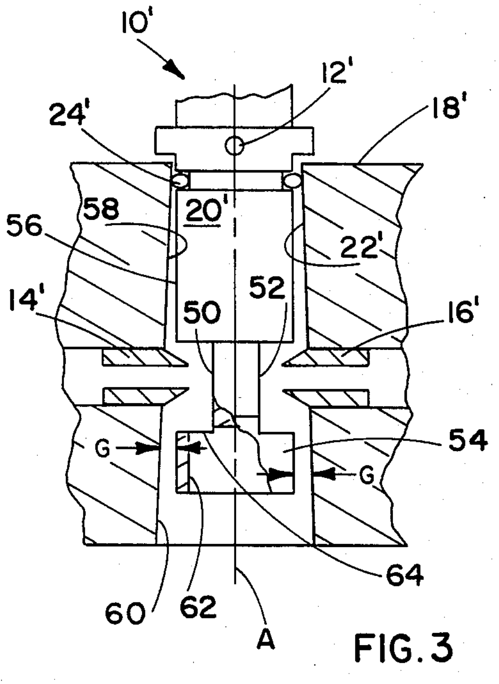
FIG. 3 is an enlarged sectional view showing the lower flapper/nozzle arrangement of the preferred form of practicing the invention.

The structure taught in FIG. 3 is a partially enlarged cross-section of the flapper/nozzle arrangement of FIG. 2 shown in approximately two-to-one scale of an experimental model actually produced and tested but with clearances and tapers exaggerated for clarity purposes. The flapper section 20' has an external peripheral surface 56 with a circular cross-section of 0.375 inch diameter rather than the flattened blade cross-section of the prior art flapper taught in FIG. 1. In order to have flattened areas which cooperate with the nozzles 14' and 16', the flapper section 20' is provided with milled flat faces 50 and 52. The flapper 10' continues beyond the faces 50 and 52 and has a lower section herein referred to as the damping section 54 which is also a circular cross-section and of 0.375 inch diameter. Thus the lower portion of the flapper 10' below the pivot 12' in FIG. 3 is formed of a right circular cylinder of 0.375 inch diameter except in the area of the two milled flat faces 50 and 52 which are spaced apart 0.155 inch and in alignment with the nozzles 14' and 16'. While the lower portion 54 near the free end of the flapper is referred to as the damping section, some damping occurs along the total length of the lower portion of the flapper from the free end to the O-ring 24'. The bore or passageway 22' which encircles the lower end of the flapper section 20' has an internal wall 58 which is also of circular cross-section but tapers slightly from near the O-ring 24' wherein the diameter of the bore 22' is 0.383 inch to a point below the free end of the flapper where the diameter of the bore 22' is 0.387 inch. Thus a tapered peripheral gap G is provided between the lower end of the flapper and the bore 22', this peripheral gap G increasing from 0.004 inch near the O-ring 22' to 0.006 inch near the free end of the flapper 10' when the flapper 10' is in a central or null position. The free end of the flapper 10' during the control operation has a normal stroke of plus or minus 0.003 inch relative to a vertical axis A passing though the bore 22' and pivot 12' for a total excursion of 0.006 inch. The taper of the bore 22' provides sufficient clearance for the stroke of the flapper 10' while always providing a limited gap for an oil film. During full excursion of the flapper 10' the gap G near the free end of the flapper will vary from 0.003 a to 0.009 whereas the gap just below the O-ring 24' will be substantially constant at 0.004 since there is little excursion of the flapper section 20' at this point since it is very close to the pivot 12' which is located 0.062 inch above the top edge of the housing 18.

The fluid passing though the nozzles 14' and 16' is received by the bore 22' and forms an oil film on the internal periphery of the bore 22'. It is this oil film which acts against the external periphery of the flapper section 20' to create the oil squeeze film damping action. This damping action increases in effect at points further from the pivot 12' for two reasons. First, any given force from the squeeze film damping acts on longer moment arm as one progresses from the pivot 12' and thus generates greater torque on the flapper 10'. Secondly, the damping action of a film squeeze damper is proportional to the relative velocity of the two walls squeezing the oil film. Any movement of the flapper 10' causes greater excursion and thus increased relative velocity between the relatively moving surfaces 56 and 58 as one progresses away from the pivot point 12'.

In the example provided in FIG. 3, the axial dimension between the pivot 12' and the center line of the nozzles is 0.750 inch whereas the axial dimension from the center line of the nozzles to the free end of the flapper is 0.372 inch. Thus the portion of the flapper section 20' above the nozzle center line is approximately twice as long as the portion of the flapper section below the nozzle center line. However due to the increased damping effect at points farther away from the pivot 12' as described above, the majority of the squeeze film damping will occur below the nozzle center line. Furthermore the pivoted movement and the tapered gap tend to maintain a parallel relationship between the two surfaces 56 and 58 which squeeze the oil film upon excursion of the flapper section 20'. This squeeze film damping has been found to be particularly effective at flapper velocities caused by harmonic vibration in the range of 400 to 500 hz but of considerable reduced effect in the lower range of normal control velocities.

While the bore 22' could be closed along a bottom wall thereof beneath the free end of the flapper 10' with other means such as a transverse bore providing relief to the exhaust passageway, in the preferred form of practicing the invention the bottom end of bore 22' leads to the exhaust port $P_e$. Thus the lower portion of bore 22' below the nozzles 14' and 16' provides a nozzle flow exhaust passageway. Since the peripheral gap G is of small size, on the order of a few thousands of an inch, only a limited amount of hydraulic fluid can pass therethrough causing a restriction which substantially increases the pressure within the bore 22' and thus the available pressure drop across the nozzles 14' and 16'. Therefore, in order to provide a flow passageway for a substantial amount or the majority of the fluid passing from the nozzles 14' and 16', the lower end of the flapper section 20' below the flattened walls 50 and 52 is provided with an internal bore 62 of approximately 0.300 inch diameter.

Figure 4:
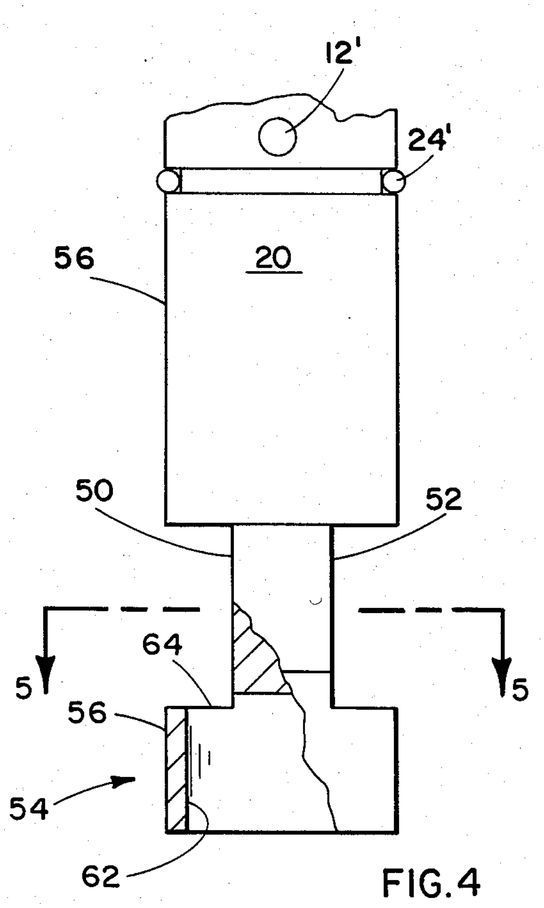
FIG. 4 is an enlarged view showing the construction of the lower end of the flapper of FIG. 3.
Figure 5:
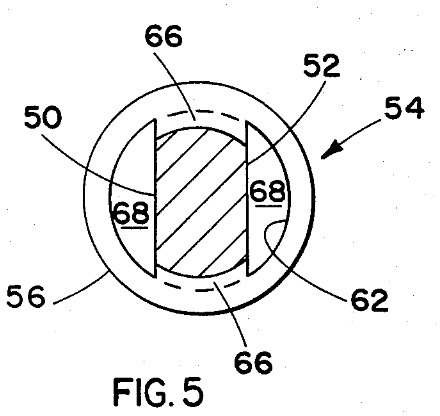
FIG. 5 is a sectional view of the lower end of the flapper taken along lines 5—5 of FIG. 4.

The bore 62, at the upper edge thereof, joins with the space between the flattened faces 50 and 52 and the nozzles 14' and 16' at step 64 as shown in FIG. 4 and FIG. 5 which is a cross-sectional view of the lower end of the flapper taken along lines 5—5 of FIG. 4. The bore 52 had a considerably large area relative to the area of the peripheral gap G and thus provides a non-restricted relief flow passage for the majority of the fluid passing from the nozzles 14' and 16' as it flows though the exhaust passageway 60. By utilizing the internal bore 62 and the lower portion 54 of the flapper, a squeeze film damping section of limited peripheral gap G is provided without inducing an ndue restriction on the relief flow from the nozzles 14' and 16'.

Experiments have determined that for effective control there should also be little restriction to flow transversely across the bore 22' in the area adjacent the nozzles 14' and 16'. If the center of the flapper section between the flats 50 and 52 was also of 0.375 inch diameter, little flow could pass around the flapper section 20' due to its close proximity to the bore 22'. Thus as one or the flats 50 or 52 restricts the flow from one of the nozzles which would increase local pressure, the two nozzles 14' and 16' would see a different pressure drop. Therefore the flapper in the area of the flats 50 and 52 (the area shown in section in FIG. 5) has an initial radius of 0.250 inch to allow flow around the flapper section 20'. The flats 50 and 52 are then milled from this section and spaced 0.155 inch apart. The flats extend 0.040 inch below the bottom of the 0.250 inch diameter section to form the steps 64.

The bore 62 from the free end of the flapper 10' extends to 0.030 inch below the bottom of the 0.250 inch diameter section and thus two 0.030 inch thick webs 66 are formed joining the narrow section with the bottom damping section 54 of the flapper 10'. Since the flats extend 0.010 inch downwardly from the bottom of the bore 62, two part circular openings 68 (shown in FIG. 5) are formed permitting flow from the nozzles 14' and 16' into, central bore 62 of the flapper damping section 54.

Figure 6:
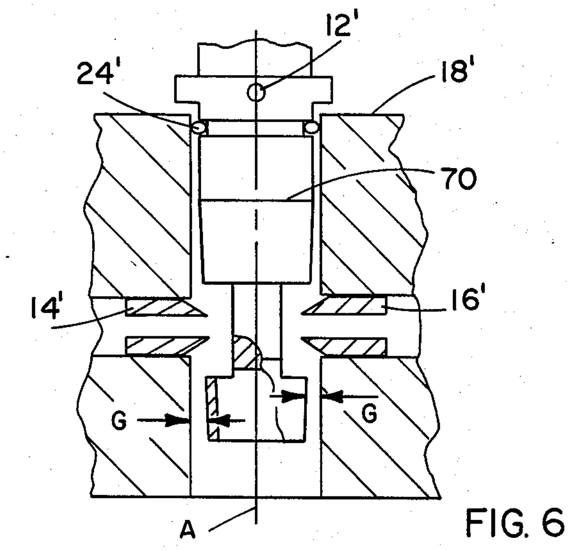
FIG. 6 is a cross sectional view of a modified form of the lower flapper/nozzle arrangement of the present invention.
Figure 7:
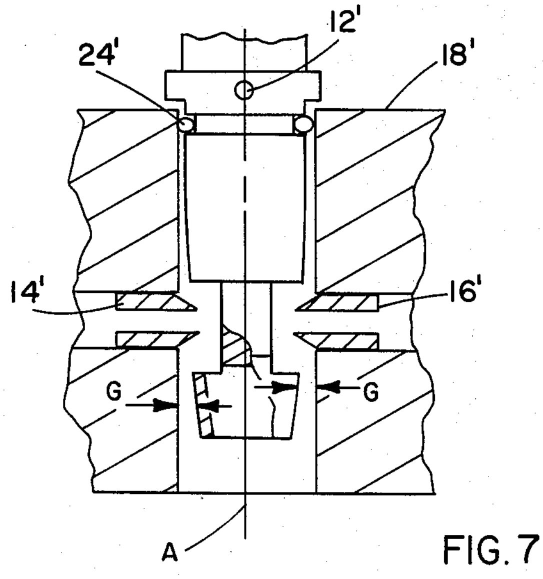
FIG. 7 is a cross sectional view of a further modification of the lower flapper/nozzle arrangement of the present invention.

FIGS. 6 and 7 show two modifications to the squeeze film damper taught in FIG. 3. Since the constructional elements are the same, the same reference numerals are utilized. The modifications of FIGS. 6 and 7 operate in exactly the same manner as that construction taught in FIG. 3. In the construction of FIG. 3, the lower portion of the flapper is in the form of a right circular cylinder of 0.375 inch diameter and the bore 22' is tapered outwardly from top to bottom. In the construction of FIG. 6 the bore 22', rather than the flapper, is a right circular cylinder and the lower portion of the flapper 20' is straight tapered inwardly from top to bottom. The taper of the flapper section 20' may extend from the free end of the flapper all the way to the O-ring 24' or may extend partially up the flapper section 20' to a point below the pivot 12' represented by line 70.

The construction of the modification of FIG. 7 is quite similar to the configuration of FIG. 6 in that the bore 22' is a right circular cylinder and the flapper section 20' is tapered inwardly from the O-ring 24' to the free end of the flapper. However the taper is a gradual curve rather than a straight taper. Another form of construction which may be utilized would be similar to that configuration of FIG. 3 only the outward taper of the bore 22' woulc be slightly curved rather than straight. Thus various constructions are conceived wherein either the bore 22' is tapered or the lower flapper section 20' is tapered, and the taper may be either a straight taper or a curved taper which forms a progressively increasing size of the peripherial gap G.

As can be ascertained from the aforesaid described structure, the object of providing a simple but effective squeeze film damping structure for a flapper/nozzle arrangement has been obtained. Although this invention has been illustrated and described in connection with the particular embodiments illustrated, it will be apparent to those skilled in the art that various changes may be made therein without departing from the spirit of the invention as set forth in the appended claims.

I claim:

1. A squeeze film damper comprising a fluid passageway having an axis, an axial member located within said passageway, said axial member being mounted on a pivot located on said passageway axis for limited pivotal movement within said passageway, a peripheral gap being defined by said axial member and said passageway, said peripheral gap increasing from a point closer to said pivot to a point farther from said pivot but of restricted size to permit squeezing of a fluid film in said gap formed from fluid passing through said passageway, said axial member including fluid passage means distinct from said gap to permit unrestricted fluid flow through said axial member and said passageway.

2. The squeeze film damper of claim 1 wherein said fluid passage means is a central bore through said axial member and said central bore, said axial member, and said passageway are all of generally circular cross-section and in coaxial relationship when said axial member is centered in said passageway.

3. A squeeze film damper for a fluid control having a nozzle directed toward a control flapper which is adapted to be positioned relative to said nozzle by an applied control force wherein the flow of fluid through said nozzle is controlled by the distance between said nozzle and said flapper to generate a control back pressure upstream of said nozzle and with the flow from said nozzle passing through an exhaust passageway downstream of said nozzle and extending away from said nozzle;

said squeeze film damper comprising a portion of said flapper spaced from said nozzle and extending into said exhaust passageway to cooperate with said passageway in a manner which provides a peripheral gap between the external periphery of said flapper portion and the internal wall of said passageway, said peripheral gap being of sufficient size to permit control movement of said flapper while said peripheral gap is of limited cross sectional area to permit the periphery of said flapper and the internal wall of said passageway to cooperate with fluid in said gap to generate a damping action upon movement of said flapper at the natural harmonic frequencies of vibration of said flapper.

4. The squeeze fim dimper for a fluid control of claim 3 wherein said flapper is mounted for pivotal motion and said peripheral gap between said flapper and said passageway internal wall diverges from the end of said passageway closest to said pivot.

5. A squeeze film damper for a fluid control having a nozzle directed toward a control flapper mounted for pivotal motion about a pivot on a first side of said nozzle said flapper being adapted to be positioned relative to said nozzle by an applied control force wherein the flow of fluid through said nozzle is controlled by the distance between said nozzle and said flapper to generate a control back pressure upstream of said nozzle and with the flow from said nozzle passing through an exhaust passageway downstream of said nozzle and extending away from said nozzle on the side of said nozzle opposite said pivot and has an axis in alignment with the pivot:

said squeeze fim damper comprising a portion of said flapper spaced from said nozzle and extending into said exhaust passageway to cooperate with said passageway in a manner which provides a peripheral gap between the external periphery of said flapper portion and the internal wall of said passageway diverging from the end of said exhaust passageway closest to said pivot, said peripheral gap being of sufficient size to permit control movement of said flapper while said peripheral gap is of limited cross sectional area to permit the periphery of said flapper and the internal wall of said passageway to cooperate with fluid in said gap to generate a damping action upon movement of said flapper at the natural harmonic frequencies of vibration of said flapper.

6. The squeeze film damper for a fluid control of claim 5 wherein said passageway walls are parallel to said axis and said flapper has straight tapered walls.

7. The squeeze film damper for a fluid control of claim 5 wherein said passageway walls are parallel to said axis and said flapper has curved tapered walls.

8. The squeeze film damper for fluid control of claim 5 wherein said flapper peripheral surface is parallel to said axis and said passageway has a straight taper.

9. The squeeze film damper for a fluid control of claim 5 wherein said flapper peripheral surface is parallel to said axis and said passageway has a curved taper.

10. The squeeze film damper for a fluid control of claim 5 wherein the portion of said flapper downstream of said nozzle has fluid passage means having a greater cross sectional area than the largest cross sectional area of said peripheral gap.

11. The squeeze film damper for a fluid control of claim 10 wherein said fulid passage means comprises a central bore extending from a portion of said flapper adjacent said nozzle to the end of said flapper opposite said nozzle and within said exhaust passageway.

12. A squeeze film damper for a hydraulic control having a pair of opposed flow nozzles directed toward a pivoted control flapper having flattened areas adjacent said nozzles and positioned relative to said nozzles by an electric force motor wherein the flow of fluid through said nozzles is controlled by the distance between said nozzles and said flapper flattened areas to generate a differential pressure upstream of said nozzles, said squeeze film damper comprising a passageway sapced from said nozzles and adapted to receive at least a portion of the fluid passing through said nozzles, a portion of said flapper being located within said passageway with sufficient clearance between said flapper and said passageway to permit control movement of said flapper and cooperating with fluid in said passageway to provide fluid damping on said flapper within said passageway at the natural harmonic frequencies of vibration of said flapper, said clearance being of lesser area closser to said pivot and of greater area farther from said pivot.

13. The squeeze film damper for a hydraulic control of claim 12 wherein said flapper is straight and having an axis passing through a pivot mounting said flapper, said flapper having an armature section on one side of said pivot forming the armature of said force motor and a flapper section on the opposite side of said pivot, said flapper section being of generally circular cross section except for said flattened areas immediately adjacent said opposed nozzles and axially spaced from said pivot.

14. The squeeze film damper for a hydraulic control of claim 13 wherein said passageway is an exhaust passageway for the fluid from said nozzles and is of circular cross section having an axis coincident with the axis of said flapper and wherein said nozzles are positioned between said pivot and said exhaust passageway.

15. A squeeze film damper for a hydraulic contol having a pair of opposed flow nozzles directed toward a pivoted control flapper having flattened areas adjacent said nozzles and positioned relative to said nozzles by an electric force motor wherein the flow of fluid through said nozzles is controlled by the distance between said nozzles and said flapper flattened areas to generate a differential pressure upstream of said nozzles, wherein said flapper being straight and having an axis passing through a pivot mounting said flapper, said flapper having an armature section on one side of said pivot forming the armature of said force motor and a flapper section on the opposite side of said pivot, said flapper section being of generally circular cross section except for said flattened areas immediately adjacent said opposed nozzles and exially spaced from said pivot, said squeeze film damper comprising an exhaust passageway of circular cross section having an axis coincident with the axis of said flapper and spced from said nozzles and adapted to receive at least a portion of the fluid passing through said nozzles, said nozzles being positioned between said pivot and said exhaust passageway, a portion of said flapper being located within said passageway with sufficient clearance between said flapper and said passageway to permit control movement of said flapper and cooperating with fluid in said passageway to provide fluid damping on said flapper within said passageway, said clearance being of lesser area closer to said pivot and of greater area farther from said pivot, and wherein said portion of said flapper section extends from said flattened areas to a free end of said flapper section opposite said pivot includes fluid passage means to permit passage of the majority of fluid flow from said nozzles through said exhaust passageway.

16. The squeeze film damper for a hydraulic control of claim 15 wherein said fluid damping section is provided by a peripheral gap between the external periphery of said flapper section and the internal walls of said exhaust passageway and wherein said peripheral gap increases in area from the end of the exhaust passage adjacent said nozzles to the free end of said flapper section.

17. The squeeze film damper for a hydraulic control of claim 16 wherein the peripheral gap increases at a linear rate.

18. The squeeze film damper for a hydraulic control of claim 16 wherein the peripheral gap increases at a geometric rate.

19. A squeeze film damper for a hydraulic control having a pair of opposed flow nozzles directed toward a control flapper which is adapted to be positioned relative to said nozzle by an electric force motor wherein the flow of fluid through said nozzles is controlled by the distance between said nozzles and said flapper to generate a control pressure differential upstream of said nozzles and with the flow from said nozzles passing through an exhaust passageway downstream of said nozzles and extending perpendicularly from said nozzles, said exhaust passageway being of ciruclar cross section and having an axis, a pivot for mounting said flapper axially spaced from said nozzles and located on said axis on the side of said nozzles opposite said exhaust passageway, said flapper being straight and having an axis passing through said pivot mounting said flapper, said flapper having an armature section on one side of said pivot forming the armature of said force motor and a flapper section on the opposite side of said pivot including said flattened areas which cooperate with said nozzles, said squeeze film damper comprising a damping section of said flapper located within said exhaust passageway, said damping section of said flapper being of generally circular cross section and axially extending from said flattened areas immediately adjacent said opposed nozzles into said exhaust passageway, said flapper damping section and said exhaust passageway cooperate to define a peripheal gap between the external periphery of said damping section and the internal wall of said exhaust passageway and wherein said peripheral gap increases in area from the end of said flapper section opposite said pivot, said peripheral gap being of sufficient size to permit limited control movement of said flapper but of sufficiently close tolerance to generate squeeze film damping on flapper movement by fluid located within said peripheral gap when said flapper is vibrating at its natural harmonic frequency.

20. The squeeze film damper for a hydraulic control of claim 19 wherein said flapper damping section extending from said flattened areas includes a central bore permitting passof at least the majority of fluid flow from said nozzles through said exhaust passageway.

* * * * *